Patented Nov. 20, 1928.

1,692,697

UNITED STATES PATENT OFFICE.

WILLIAM JACKSON POPE, OF CAMBRIDGE, ENGLAND, ASSIGNOR TO BRITISH DRUG HOUSES LIMITED, OF LONDON, ENGLAND, A BRITISH COMPANY.

PROCESS FOR THE MANUFACTURE OF BENZAMINE BORATE.

No Drawing. Original application filed March 18, 1926, Serial No. 95,785, and in Great Britain July 28, 1925. Divided and this application filed December 7, 1926. Serial No. 153,213.

This application, which is a division of my application, Serial No. 95,785, filed March 18, 1926, relates to the manufacture of a compound for producing local anæsthesia, namely a benzamine (benzoyl vinyl diacetonalkamine) borate the chemical composition of which is such that one molecular proportion of benzamine is associated with five atomic proportions of boron, in the form of a complex boric acid.

This borate is made by double decomposition of benzamine sulphate with a barium salt of boric acid.

The sulphate of benzamine is mixed with an excess of a barium borate to remove the sulphuric acid from the sulphate of the base. The barium sulphate is filtered and thoroughly washed with alcohol. The clear filtrate is evaporated to a very low volume or to dryness and then thoroughly washed with acetone, or other suitable solvent, to give the desired borate.

The following example illustrates the invention, the parts being by weight:—

2.47 parts of benzamine base, of which the structural formula is:

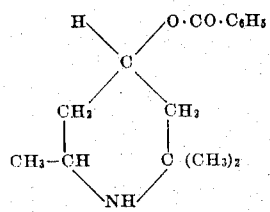

are dissolved in N-sulphuric acid (10 parts approximately), and this solution is added to an aqueous suspension of a barium borate prepared by mixing 3.15 parts of crystalline barium hydroxide with 2.48 parts of boric acid. After warming for a short time the insoluble material is separated and washed with warm alcohol. The filtrate and washings are mixed and evaporated and the residue is washed with acetone, the solid separated and washed with more acetone. The product so obtained has a $P_H$ value of about 8.2 when freshly diluted with about 50 volumes of distilled water, and using phenol red as the indicator.

Having thus described the nature of the said invention, and the best means I know of carrying the same into practical effect, I claim:—

1. A process for the manufacture of a borate of benzamine, which consists in bringing together in a liquid medium benzamine in the form of sulphate and boric acid in the form of a barium compound.

2. A process for the manufacture of a borate of benzamine, which process consists in bringing together an aqueous solution of benzamine sulphate and an aqueous suspension of a borate of barium, warming the mixture, separating the solid matter from the solution of the borate of benzamine produced, and recovering the said borate from the solution.

In testimony whereof I have signed my name to this specification.

WILLIAM JACKSON POPE.